United States Patent [19]
Fuchs et al.

[11] Patent Number: 5,870,136
[45] Date of Patent: Feb. 9, 1999

[54] DYNAMIC GENERATION OF IMPERCEPTIBLE STRUCTURED LIGHT FOR TRACKING AND ACQUISITION OF THREE DIMENSIONAL SCENE GEOMETRY AND SURFACE CHARACTERISTICS IN INTERACTIVE THREE DIMENSIONAL COMPUTER GRAPHICS APPLICATIONS

[75] Inventors: Henry Fuchs; Mark Alan Livingston, both of Chapel Hill; Thomas Gary Bishop, Apex; Gregory Francis Welch, Chapel Hill, all of N.C.

[73] Assignee: The University of North Carolina at Chapel Hill, Chapel Hill, N.C.

[21] Appl. No.: 986,309

[22] Filed: Dec. 5, 1997

[51] Int. Cl.$^6$ .................................................. H04N 13/00
[52] U.S. Cl. .............................. 348/42; 348/169; 382/106
[58] Field of Search .................................. 348/36, 37, 38, 348/39, 40, 121, 135, 123, 42, 169; 382/106, 154; 356/376; H04N 13/00

[56] References Cited

U.S. PATENT DOCUMENTS

| | | | |
|---|---|---|---|
| 5,323,002 | 6/1994 | Sampsell et al. | 250/252.1 |
| 5,371,543 | 12/1994 | Anderson | 348/270 |
| 5,446,798 | 8/1995 | Monita et al. | 382/154 |
| 5,452,024 | 9/1995 | Sampsell | 348/755 |
| 5,457,493 | 10/1995 | Leddy et al. | 348/164 |
| 5,488,431 | 1/1996 | Gove et al. | 348/716 |
| 5,489,952 | 2/1996 | Gove et al. | 348/771 |
| 5,491,510 | 2/1996 | Gove | 348/77 |
| 5,526,051 | 6/1996 | Gove et al. | 348/388 |
| 5,532,997 | 7/1996 | Pauli | 369/112 |
| 5,541,723 | 7/1996 | Tanaka | 356/3.01 |
| 5,570,135 | 10/1996 | Gove et al. | 348/581 |
| 5,608,468 | 3/1997 | Gove et al. | 348/771 |
| 5,612,753 | 3/1997 | Poradish et al. | 348/743 |
| 5,629,794 | 5/1997 | Magel et al. | 359/290 |
| 5,630,027 | 5/1997 | Venkateswar et al. | 395/108 |
| 5,699,444 | 12/1997 | Palm | 348/42 |

OTHER PUBLICATIONS

Agrawala et al., "*The Two–User Responsive Workbench: Support for Collaboration Through Individual Views of a Shared Space*", Computer Graphics Proceedings, Annual Conference Series, 1997, pp. 327–332.

*Primary Examiner*—Tommy P. Chin
*Assistant Examiner*—Gims Philippe
*Attorney, Agent, or Firm*—Myers Bigel Sibley & Sajovec

[57] ABSTRACT

Methods, systems and computer products are provided for tracking objects within a scene using imperceptible structured light. The imperceptible structured light may be used in environments where humans work and therefore avoids disorienting observers. The structured light patterns are generated dynamically, allowing tracking without physical landmarks. Moreover, the occlusion of the generated landmarks is overcome by determining the position of objects using a determined camera position. The imperceptible structured light may be used in systems without tracking. The tracking may be used without imperceptible structured light.

29 Claims, 9 Drawing Sheets

DYNAMIC GENERATION OF IMPERCEPTIBLE STRUCTURED LIGHT FOR TRACKING AND ACQUISITION OF THREE DIMENSIONAL SCENE GEOMETRY AND SURFACE CHARACTERISTICS IN INTERACTIVE THREE DIMENSIONAL COMPUTER GRAPHICS APPLICATIONS

This invention was made with Government support under grant number DABT63-93-C-0048 from ARPA and under grant number 8920219 from The National Science Foundation. The Government has certain rights to this invention.

FIELD OF THE INVENTION

The present invention relates generally to augmented reality and more particularly to registration of computer generated graphics to real world objects or images of real world objects.

BACKGROUND OF THE INVENTION

While the advent of Head-Mounted Displays (HMDs) and affordable real-time computer graphics engines has given rise to much research in the field of Virtual Reality (VR), comparatively little work has been done in the field of Augmented Reality (AR). A VR system immerses the user in a totally synthetic computer-generated environment. An AR system, on the other hand, merges computer synthesized objects with the user's space in the real world. In an AR system, computer generated graphics enhance the user's interaction with, or perception of, the real world. The range of applications that can benefit from this kind of technology include medical care, mechanical design and repair, architecture and interior design, and educational or information display. Such views of the world are frequently generated by acquiring a video image from the real world, then overlaying graphics onto that image.

For AR systems to become truly beneficial, AR systems should provide accurate registration between computer generated graphics and real objects. A virtual object should appear at its proper place in the real world, otherwise it is difficult for the user to correctly determine spatial relationships. Furthermore, the registration of the computer generated graphics should be dynamic in that it can account for changes in the real world. Dynamic registration is particularly important when the user moves around in the environment. The relative position between real and computer generated (synthetic) objects should be constant.

An AR system must also provide a reasonable image generation rate (10 Hz) and stereopsis. Both image generation rate and stereopsis are important for good depth perception. The lack of kinetic or stereoscopic depth cues greatly reduces the believability of an augmented environment.

An AR system should also be simple to set up and use. Users of AR applications should not have to be familiar with the specific techniques used in AR systems. As many of the applications of augmented reality environments involve tasks which are carried out by users who are typically not versed in the intricacies of computer graphics systems, a simple set up and use are important to the proliferation of AR systems.

The AR system should also put minimal constraints on user motion. In many applications the user wants to move without restriction.

Finally, an AR system should have minimal latency. There should be as little as possible delay between the user's movement and the display update. Reduction in latency between movement and reflection of that movement in the environment is generally required for smooth and effective interaction.

Among the requirements for an effective AR system, the accurate registration of the computer generated graphics can have a significant impact on the perception of the augmented reality. To the best of the inventors' knowledge, typical existing AR systems do not convincingly meet this requirement. Typically, two problems that have prevented AR from becoming a common method of delivering applications to clients are registration and occlusion.

Registration refers to the alignment between real and synthetic objects on the image plane. There are many pieces of an AR system that contribute to registration of the final image. One of the most important is the system that tracks the position and orientation of the user's eyes or head, from which the location of the eyes is determined. The output of this system is passed to the image generation system in order to generate a view of the synthetic world that matches the user's view of the real world. This data must be accurate, so that the real and synthetic objects are aligned, and this data must be timely, so that the synthetic objects do not appear to swim back and forth in relation to the real world objects. If precise alignment is achieved, proper occlusion relationships can be established between real and synthetic objects. That is, portions of real objects that are behind portions of synthetic objects in the merged world must be obscured by those synthetic objects in the final image. Synthetic objects that are behind real objects in the merged world must similarly be obscured by those real objects. In other words, the image generation system must know when to paint or not to paint synthetic objects into the final image. Performance of either version of this task requires that the system know the depths of the real objects from the camera. Many applications acquire this data before the system runs and assume that the scene is static. In many applications, this assumption is not valid, so the object's depth must be recomputed or reacquired in real time in order to maintain the illusion of a merged world.

Existing methods of tracking include: magnetic, mechanical, ultrasonic, and optical and other vision-based systems. Magnetic systems are robust but inaccurate in practical environments, due to a distortion of the magnetic field. Conventional magnetic trackers may be subject to large amounts of error and jitter. An uncalibrated system can exhibit errors of 10 cm or more, particularly in the presence of magnetic field disturbances such as metal and electric equipment. Carefully calibrating a magnetic system typically does not reduce position errors to much less than about 2 cm. Despite their lack of accuracy, magnetic trackers are popular because they are robust and place minimal constraints on user motion.

Mechanical systems are accurate but suffer from limited range, ergonomic and safety issues, and by being able to track only one object. Ultrasonic systems are of limited accuracy, suffer from environmental interference (e.g., temperature) and obstruction of emitter and receiver, and are slow. Ultrasonic systems also add sound structure to the environment.

Optical systems can be broken down into categories of inward-looking or outward-looking. Either method may suffer from obstruction of landmarks. Inward-looking may suffer from stability problems and poor accuracy of orientation measurements. Such tracking methods have been used to track the user's head position and orientation or the structure of a scene, but in a relative sense only. That is, either the landmarks or the cameras are assumed to be static, and the other can therefore be tracked relative to the static object.

Another method of tracking is a vision-based tracking system which uses image recognition to track movement. In a video see-through AR system, video images of the user's view are available. However, recovering 3D information from 2D images is generally difficult. One common problem of utilizing image recognition to track movement and register computer generated graphics in a VR system is that an almost infinite number of possibilities may need to be considered for the images to be interpreted correctly. Model-based vision, which assumes a prior knowledge of the 3D geometry of visible objects, reduces the problem from shape recovery to mere camera motion tracking, however, even by simplifying the problem this way, model-based vision methods typically still extract object features from images. This generally involves special-purpose image processing hardware to achieve real-time updates.

Some systems have demonstrated success by using a vision-based tracking of landmarks, physically placed in the scene, which are detected in the camera image. Some systems employ colored dots as landmarks. Other systems, including commercial systems, use LEDs as landmarks.

One problem with this approach is that the landmarks impose constraints on the user's interaction with the world. The landmarks must be in the field of view in order to benefit from the vision-based tracking and the user must avoid them to perform the task at hand. It is not, however, always practical to assume the environment or the user's head to be static. This can lead to occlusion of the landmarks from the user's view. Finally, such tracking systems cannot adapt to these changes, and place restrictions on the lighting of the scene.

Another vision based technique involves determining the structure of a scene by tracking features through a sequence of images of the scene taken from a camera (usually of known intrinsic parameters) at known position and orientation in the world. Similarly, methods have been demonstrated to solve for the camera motion parameters by tracking features in a scene of known geometry (again, usually with known intrinsic camera parameters). These algorithms rely on establishing a set of correspondences between the images. Correspondence between images has been attempted using texture patterns, physical landmarks, natural features, and perceptible structured light patterns. None of these systems, however, are optimal for AR applications. Texture patterns and physical landmarks impose a structure on the environment that is impractical for many applications. Natural features are computationally expensive to track (segment, in the vision literature) and robustness is difficult to achieve.

Extraction of live three dimensional measurements from scenes is desired in a wide variety of applications (e.g., robotics and manufacturing). In controlled environments, an active light (such as a scanning laser) is frequently used. Applications that require human participation in the environment, however, cannot easily use an active light. Perceptible structured light patterns are not practical in environments in which humans must do work, since human users frequently become disoriented and even physically ill when immersed in such environments.

In view of the above, there exists a need for an improvement in AR systems to allow for depth extraction in scenes and highly accurate registration of computer generated graphics while still providing adequate accuracy, freedom of movement of the user, simplicity of setup and use and acceptable latency between motion and reflection of that motion in the augmented environment.

OBJECTS AND SUMMARY OF THE INVENTION

In light of the above discussion, it is an object of the present invention to provide a more flexible method of extracting geometric data from a three dimensional scene.

It is another object of the present invention to provide a method of tracking the movement of a camera within a scene and the values of the internal parameters of the camera using dynamically generated landmarks.

It is another object of the present invention to determine depth measurements for real objects within the user's view, so as to determine proper occlusion relationships between real and computer generated imagery.

It is yet another object of the present invention to track camera movement within a 3D scene without using perceptible landmarks or structured light.

These and other objects of the present invention are provided by projecting a sequence of imperceptible structured light patterns onto a scene and using the structured light patterns as landmarks for determining three dimensional information about the scene.

The three dimensional information may be determined using imperceptible structured light by projecting a sequence of at least two structured light patterns within a projection interval onto a scene. The first pattern is structured so as to detect geometric data of the scene and projected for a first projection time onto the scene. The second pattern is structured so as to reduce an observer's perception of a visual artifact created by the projection of the first structured light pattern and projected for a second projection time. By providing two light patterns, a structured light pattern may be created which is imperceptible to an observer and which does not result in disorienting the observer or illness of the observer while still providing landmarks for tracking or extraction of geometric data. At least one reflected pattern from the scene is detected in a two dimensional image plane of the at least one camera. The reflected pattern is a reflection of the corresponding structured light pattern. The scene is sampled coincident with the projection of the pattern within the sequence. The 3D information may be determined using the camera position and the correspondence between the position of elements in the structured light pattern and the position of the same elements in the camera image plane. The tracking of camera movement may be accomplished by projecting a pattern onto a scene from a known position, detecting a reflected pattern from the scene in the two dimensional image plane of at least one camera and determining a current estimated camera location based on a correspondence between the position of elements of the structured light pattern and the position of the same elements in the camera image plane. Using projected light patterns as landmarks for tracking or extraction avoids the problems of landmark installation, measurement and occlusion described above. In one embodiment, the camera tracking is based on a correspondence between the position of elements of the structured light pattern and the position of the same elements in the camera image plane. Preferably, the structured light pattern is the imperceptible structured light pattern discussed above.

In another embodiment, the camera tracking is based on predicting a line equation representing a projection of a segment of the structured light pattern within the two dimensional image plane of a camera. An error associated with the predicted line equation and the position of the reflected pattern in the two dimensional image plane is determined and applied so as to update a previous estimated location of the camera, producing a current estimated camera position.

Furthermore, the embodiments described above enable the determination of geometry information, including camera tracking, without using physical landmarks. Rather, the landmarks are generated dynamically using imperceptible structured light and the geometry is extracted using either a Kalman filter to predict the camera's position or by extracting the geometry from the correspondence among elements within the pattern's structure. Additionally, the landmarks need not be static in the environment, so that landmark occlusion is less of a problem. The number of landmarks in the scene could be changed dynamically and automatically.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiments set forth herein; rather these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Figure 1:
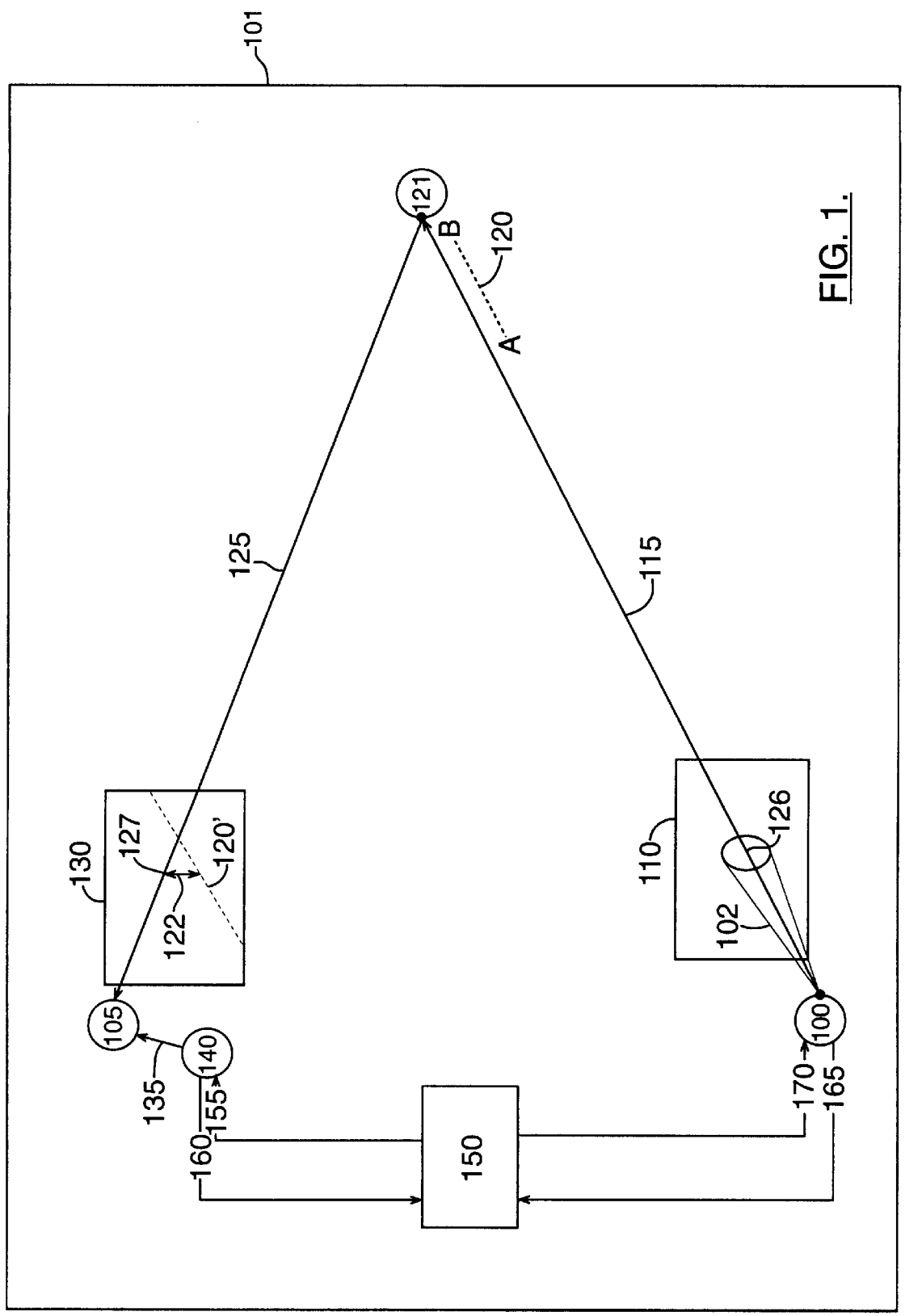
FIG. 1 is a block diagram of a scene containing 3D geometry including a camera.

FIG. 1 illustrates a system for tracking camera movement with imperceptible structured light utilizing the present invention.

In the present embodiment, the projector 100 is a pattern generator that can be loaded with a pattern for projection at a controlled time. One skilled in the art, however, will appreciate that many devices may be used to generate light patterns. Digital Light Projectors (DLPs) are available in a number of configurations from a range of manufacturers. For example, the projector 100 may be implemented using a modified Vision Light Projector or a Displaytech CDK-0307-VGA Liquid Crystal Display (LCD) Projector.

In the present embodiment, the camera 105 can sample the image of a scene under the control of the computer 150 using an exposure timing signal 155. For example, a commercial JVC video camera may be used to implement the camera 105. One skilled in the art, however, will appreciate that other devices may be used to sample the structured light patterns. Digital cameras are available in a number of configurations from a range of manufacturers and may be substituted, along with suitable interface hardware, for an analog camera. For example, the camera 105 may be implemented using an Electrim EDC1000U. The camera 105 stores a sample of the scene 101 in response to the exposure timing signal 155. The stored image 160 is then transferred to the computer 150 for processing.

The computer 150 configures the structured light patterns 115 displayed by the projector 100 and controls the capture of the reflected patterns 125 by the camera 105. The computer 150 also processes the sampled reflected patterns 125 and the structured light patterns 115 to determine the current estimated camera position and the position of objects within the scene 101. In the present embodiment the computer 150 is a general purpose computer. One skilled in the art, however, will understand that other components may be substituted to supply the same functions. For example, the computer 150 may be implemented using a Silicon Graphics (SGI) Workstation equipped with a digital input/output board. Alternatively, if an analog camera is used to implement the camera 105, an SGI Workstation with a suitable frame grabber board could be used to implement the computer 150.

The scene 101 represents a working volume covered by the present invention. The scene 101 may include a range of working environments. For example, the scene 101 may be an operating room or a business office.

The computer 150 controls the loading of a bit map 170 into the projector 100 and an exposure timing signal 155 to the camera 105. The computer 150 also accepts an image 160 from the camera 105 and a sync signal 165 from the projector 100.

The projector 100 projects structured light patterns onto the scene 101. The projector 100 projects the structured light pattern 115 from its center of projection 102. A point in the structured light pattern 115 passes through a projector image plane 110 at a point 126 and impinges on an arbitrary object 121 within the scene 101. The segment 120 represents a portion of the structured light pattern 115 between point A and point B. The reflected pattern 125 represents a reflection of the structured light pattern 115 from the object 121. The reflected pattern 125 passes through a camera image plane 130 at a position 127 and is detected by the camera 105.

A line segment 120' represents the perception of the segment 120 from the perspective of the camera image plane 130. An error 122 represents the displacement from the line segment 120' to the position 127 of the reflected pattern 125 in the camera image plane 130. The error 122 is used to generate a camera position adjustment 135 or adjust a set of internal projection parameters. The camera position adjustment is used to produce the current estimated camera position of a camera 105.

Imperceptible Structured Light

In reference to FIG. 1, the production of imperceptible structured light will now be described in greater detail. The computer 150 loads the projector 100 with the bit map 170 representing a structured light pattern. The pattern is structured so that the reflected pattern 125 can be used to determine geometry information concerning the scene 101 in general and objects within the scene 101 in particular. For example, the distance from the camera to a particular object may be determined using the reflected pattern 125 and the structured light pattern 115.

In a particular embodiment of the present invention, the computer 150 generates a first pattern with a black background and a single white pixel. The computer 150 also generates a second pattern which is the inverse of the first pattern. The first pattern is projected as structured light pattern 115 for a time: $t_k$. The second pattern is then projected as structured light pattern 115 for a longer time: $t_{k+1}$, where $t_{k+1}$ is twice as long as $t_k$. As a result, an observer perceives the white background light from the second pattern more than the light from the first pattern. In other words, the balancing of the intensity over the total projection time of the sequence compensates for a visual artifact produced by the first pattern. For example, the first pattern may produce, in the absence of the second pattern, a perceptible flicker effect. However, by inclusion of the second pattern the flicker effect may be reduced or eliminated.

In the above embodiment, the first pattern is structured using a single pixel. Other structures may, however, be used to extract 3D geometry information about the scene. For example, a pattern structured as a line or other coherent geometric shape may be used as the pattern structure.

The present invention may also be practiced by dynamically placing the structured light patterns at different regions of the working volume. In this way, specific geometric information can be obtained for a region of the working volume that has changed or is more complex than other regions. For example, if a surface occluding a region of the working volume were removed, there would be little geometric information concerning the exposed region. The structured light patterns could be dynamically altered to extract information regarding the exposed scene. Moreover, other common problems in computer vision, such as textured or highly oblique surfaces, may be analyzed using the present invention in a similar fashion.

The invention may be practiced by selecting structures for the first and second patterns that are complementary. In other words, because the invention may be utilized to generate variable structures that may be dynamically placed within the scene 101, the second pattern can be specifically structured to reduce any visual artifact produced by the first pattern as the first pattern is moved throughout the scene 101. For example, the second pattern could be the equivalent of a negative image of the first pattern wherever the first pattern is projected in the scene 101. Because the human visual system integrates light over a finite period of time the two complementary patterns, projected sequentially at the proper rate, may be perceived as projecting a substantially uniform light having constant intensity over all picture elements rather than the two patterns.

Figure 2:
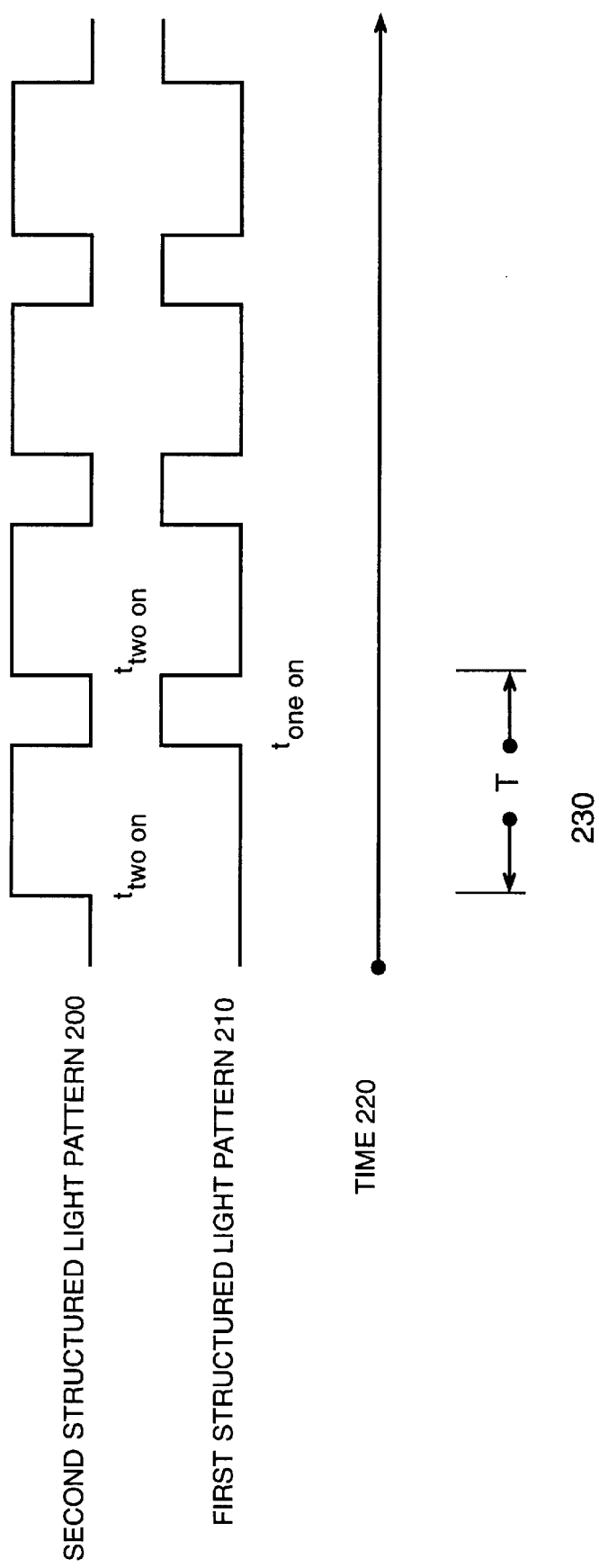
FIG. 2 is a timing diagram showing the timing relationship between the projection of the first and second structured light patterns to create imperceptible structured light.

FIG. 2 illustrates the timing relationship between the projection time of the first pattern and the second pattern. This embodiment of the present invention continuously displays a series of the second pattern with the first pattern being displayed periodically. As shown in FIG. 2, in the preferred embodiment the second structured light pattern 200 is projected at a time $t_{two\ on}$. The first structured light pattern is projected at a time $t_{first\ on}$. The overall period for the projection of both patterns is 15 ms, whereas the time interval for projecting the second pattern is 10 ms and the interval for displaying the first pattern is 5 ms. In other words, the projection sequence is repeated every 15 ms with the all white background described in the above embodiment being projected for 10 ms within the cycle. The first pattern is displayed for the remaining 5 ms of the cycle. One skilled in the art, however, will understand that other projection times would yield similar results. For example, a projection time of 10 ms for the first pattern and a projection time of 5 ms for the second pattern would produce substantially imperceptible light using the technique described in the preferred embodiment.

Figure 3:
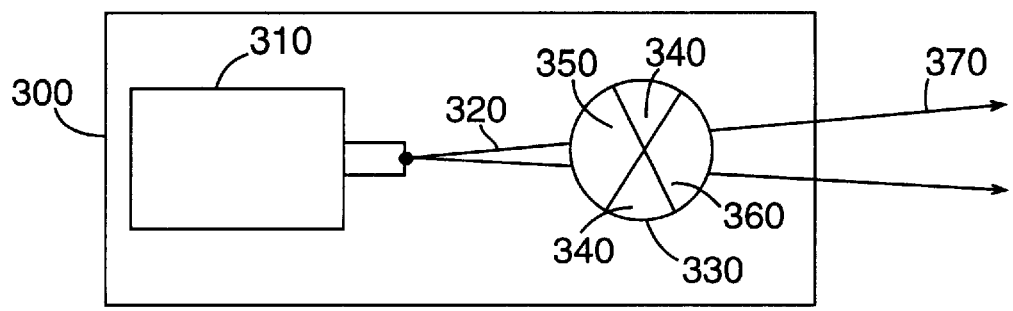
FIG. 3 is a block diagram of a conventional Digital Light Projector.

FIG. 3 illustrates a color DLP that may be modified for use as part of a system to practice the present invention. In its normal configuration, the DLP displays color images by projecting the red, green, and blue color information sequentially as separate grayscale images, and then passing the light through a rotating three color filter wheel that is synchronized with the sequential grayscale image projection. DLP 300 consists of an image projection assembly 310 for projecting grayscale images 320 and a color wheel 330. The greyscale images 320 are projected through the rotating color wheel 330. The rotating color wheel 330 is divided into three equal areas with each area having an associated channel: red area 340, blue area 350, and green area 360. Projected image data is filtered by whichever channel of the color wheel 330 is in the synchronized location at a time $t_{sync}$.

To produce a color projection 370 from the greyscale images 320, the appropriate grayscale image data is projected through the color wheel 330 when the proper area of the color wheel is in the synchronized position. Therefore, each triplet of color is generated by synchronizing the rotation of the color wheel 330 with the projection of the greyscale images 320. Moreover, the color wheel 330 spins at 180 revolutions per second (rps) which enables the DLP to produce a color projection 370 at approximately 60 frames per second.

Figure 4:
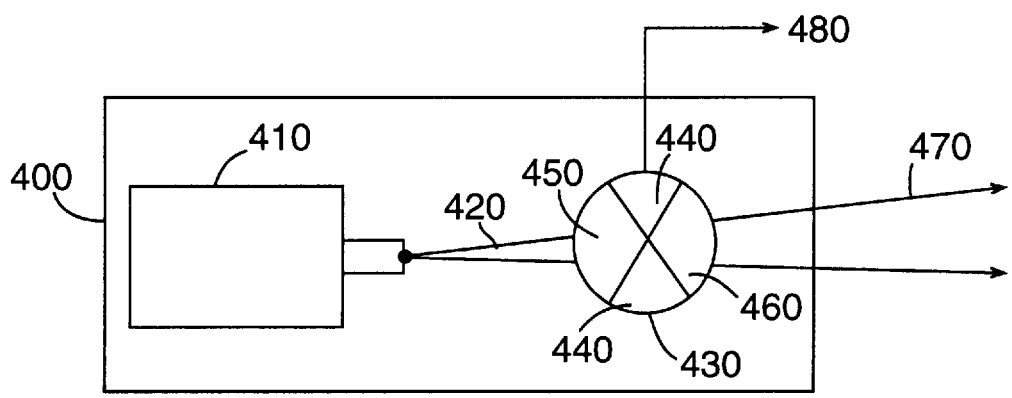
FIG. 4 is a block diagram of a modified Digital Light Projector for use according to the present invention.

FIG. 4 illustrates a modified color DLP that may be used as part of a system to practice the present invention. The DLP 400 consists of a projection assembly 410 for projecting greyscale images 420 and a rotating non-color wheel 430. The non-color wheel 430 is divided into three equal areas with each area having an associated channel. Unlike the color wheel 330, the non-color wheel 430 has only grayscale areas. Consequently, the three color channels may be dedicated to producing only grayscale images. The time allocated for each of the color channels is then re-allocated entirely to projecting the first and second structured light patterns described above. An internal signal 480 is used to synchronize the rotation of the non-color wheel 430 by the computer 150 with the projection of grayscale image data for each color channel.

In the present embodiment, the first structured light pattern is displayed using the blue channel 450. Similarly, the red channel 440 and the green channel 360 are used to project the second structured light pattern. Consequently, the first structured light pattern is displayed for one third of the time and the second structured light pattern is displayed for the remaining two thirds of the time. Therefore, the modified DLP 400 is capable of projecting the first structured light pattern approximately 60 times per second with minimal perceptibility on the part of an observer.

Figure 5:
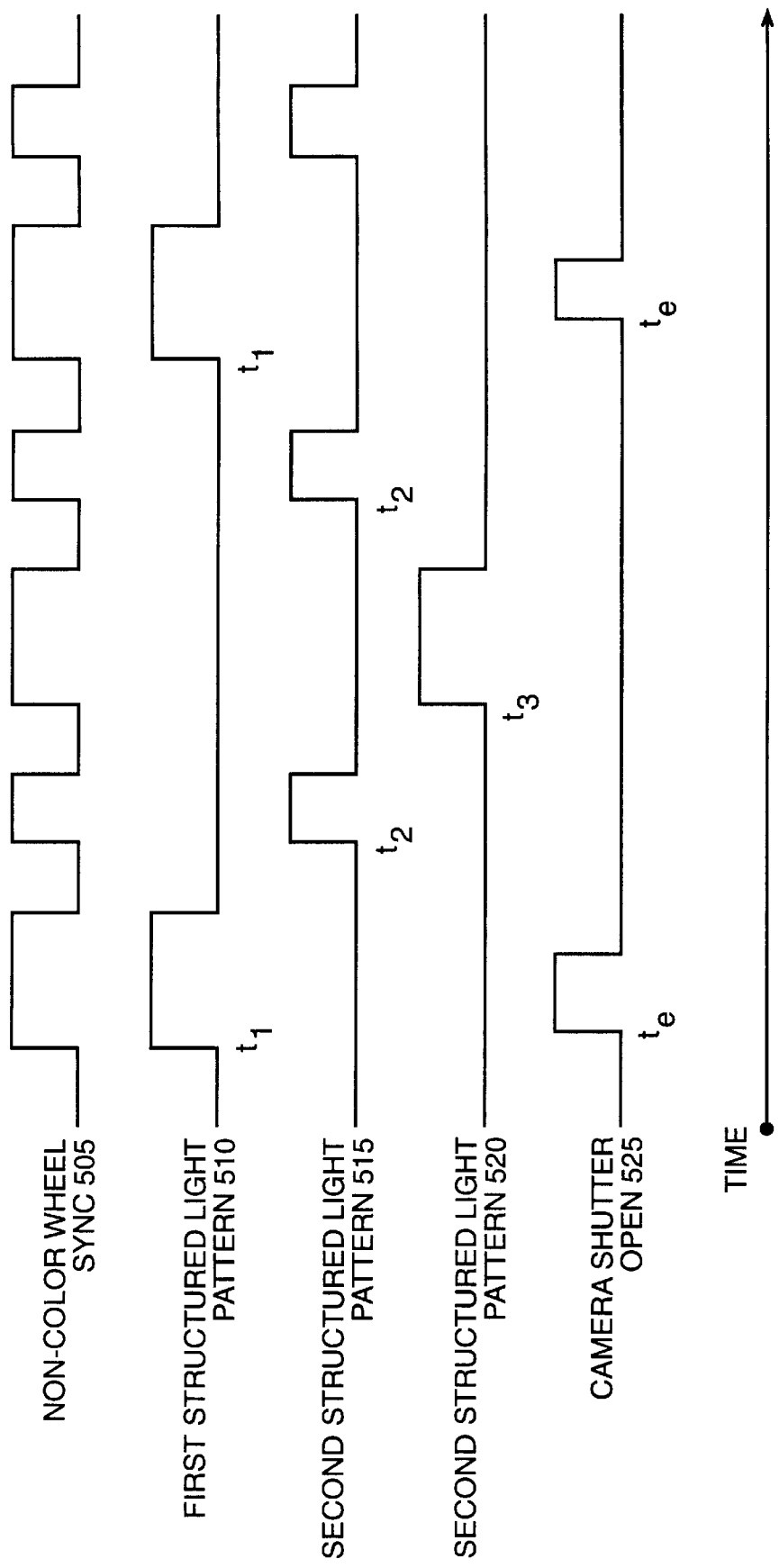
FIG. 5 is a timing diagram showing the timing relationship of the camera exposure to the projection of structured light patterns of imperceptible structured light.

FIG. 5 and FIG. 1 illustrate the synchronization of the camera exposure to the projection of the structured light pattern 115. The modification of the DLP 400 enables the system utilizing the present invention to project the sequence of structured light patterns onto the scene 101 at the proper time.

The non-color wheel sync 505 signals the proper time for the display of grayscale image data for a particular color channel. The first structured light pattern time 510 signals the projection time for the first structured light pattern. The second structured light pattern 515 signals the projection time for the second structured light pattern. The second structured light pattern 520 signals a second projection time for the second structured light pattern. Each of the pattern projection times described above synchronizes the projection of the proper structured light pattern. For example, the non-color wheel sync 505 signals that $t_1$ is the proper time for displaying the first structured light pattern 510. Similarly, the non-color wheel sync 505 signals that $t_2$ and $t_3$ are the proper times for displaying the second structured light pattern 515.

The camera shutter open 525 is synchronized to the projection of the first structured light pattern 115 using the camera's exposure timing signal 155. The exposure timing signal 155 is applied to the camera at time $t_e$ so that the camera shutter is opened only when the first structured light pattern 115 is projected onto the scene 101.

The exposure timing signal 155 can be created by transmitting a buffered version of the internal signal 480 used by the DLP 400 for synchronizing the projection of grayscale image data to color channels to the computer 150. The computer 150 determines the appropriate time to transmit the exposure timing signal 155 to the camera 105. The internal signal 480 is used to synchronize the projection of grayscale images 420 to the rotation of the non-color wheel 430 and, therefore, can be used to synchronize the projection of the first structured light pattern to the camera 105 exposure.

Tracking Camera Movement Using Imperceptible Structured Light

Referring back to FIG. 1, projector 100 projects a first structured light pattern 115 through the projector's image plane 110 at the position 126 with a center of projection 102. The first structured light pattern 115 is configured as the first structured light pattern of imperceptible structured light described above. The first structured light pattern 115 is incident upon an arbitrary object 121 within the scene 101 and serves as a dynamic landmark for use in tracking the camera's movement or estimating the internal projection parameters.

The incidence of the first structured light pattern 115 produces a reflected pattern 125. The reflected pattern 125 passes through the image plane 130 at the position 127 and is detected by the camera 105.

The system illustrated in FIG. 1 tracks the position of the camera 105 by analyzing the correspondence of the first structured light pattern 115 with the appearance of the reflected pattern 125 in the camera space.

The preferred embodiment of the present invention predicts how the structured light pattern 115 will appear in the image plane 130 based on the camera's last estimated position and the internal projection parameters of the camera 105 and the internal projection parameters of the projector 100. The prediction takes the form of a transform that maps the first structured light pattern 115 from the projector's space to the camera's space.

As described above, the structure of the first structured light pattern 115 is selected so as to determine the geometry of the scene 101, including the current estimated position of the camera 105. The computer 150 uses the structure of the first structured light pattern to predict the equation of a line 120' that lies in the image plane 130. The line 120' is an estimate of where the projection of line segment 120 will appear in the image plane 130. In other words, the line segment 120' is a prediction of how the line segment 120 would be perceived from the camera's perspective if the line segment 120 were visible.

The camera 105 position is tracked by evaluating where the reflected pattern 125 intersects the image plane 130. If the position 127 lies on the line segment 120', the camera's position, orientation and internal projection parameters and the projector's 100 internal projection parameters are deemed to be accurate. If, however, the position 127 is removed from the line segment 120' by an error 122, the current camera position, orientation or internal projection parameters or the current projector internal projection parameters require an adjustment 135. If so, the computer 150 calculates the correction 135 using the error 122. The error 122 may be attributed entirely to the camera's position, orientation, or internal projection parameters or to the projector's 100 internal projection parameters or any combination thereof. Alternatively, the error 122 may be attributed entirely to the camera position. The system may then continue the tracking process by generating a new landmark with another structured light.

Figure 6:
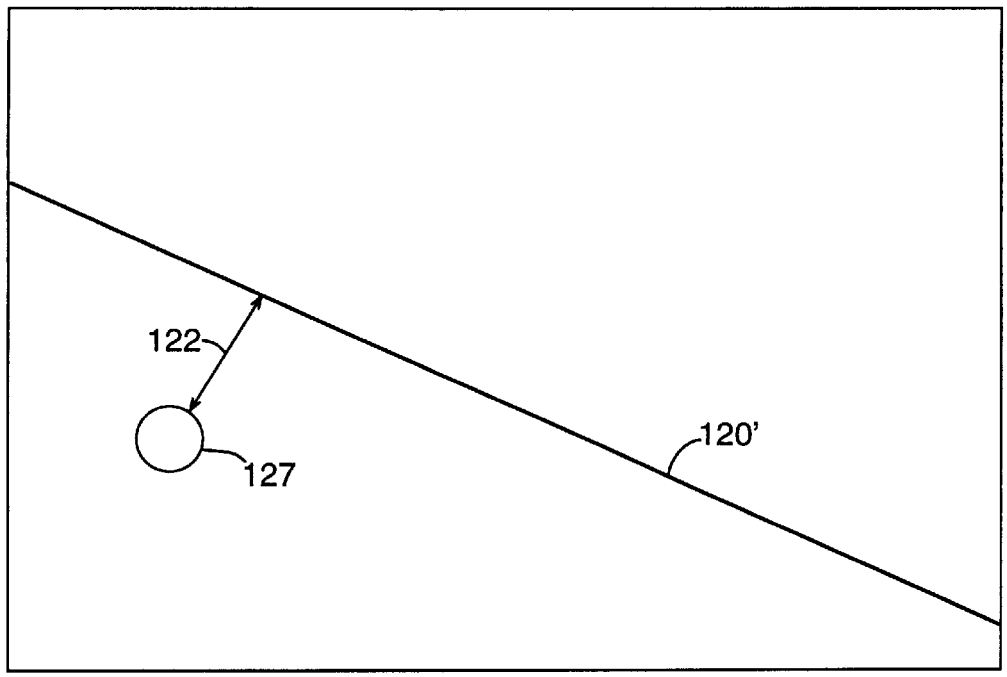
FIG. 6 is a block diagram of a view of structured light projection as seen through the camera image plane.

FIG. 6, in conjunction with FIG. 1, illustrates a view through the camera's image plane 130 showing the relationship between the line segment 120', the position 127 and the error 122. The first structured light pattern 115 appears as a visible ray projected from the projector 100. The first structured light pattern reflects off an object within the scene 101, producing a reflected pattern 125. The reflected pattern 125 intersects the camera's 105 image plane 130 at the position 127. The line segment 120 represents the portion of the structured light pattern visible through the camera's image plane 130. The line segment 120' is a prediction of how the line segment 120 will project onto the image plane 130. The error 122 represents the amount of error between the prediction of how the structured light pattern 115 will appear in the image plane 130 and where the reflected pattern is actually detected in the image plane 130. The present embodiment then uses the error 127 to adjust the current estimated camera position, orientation, or internal projection parameters or the projector's 100 internal projection parameters.

Figure 7:
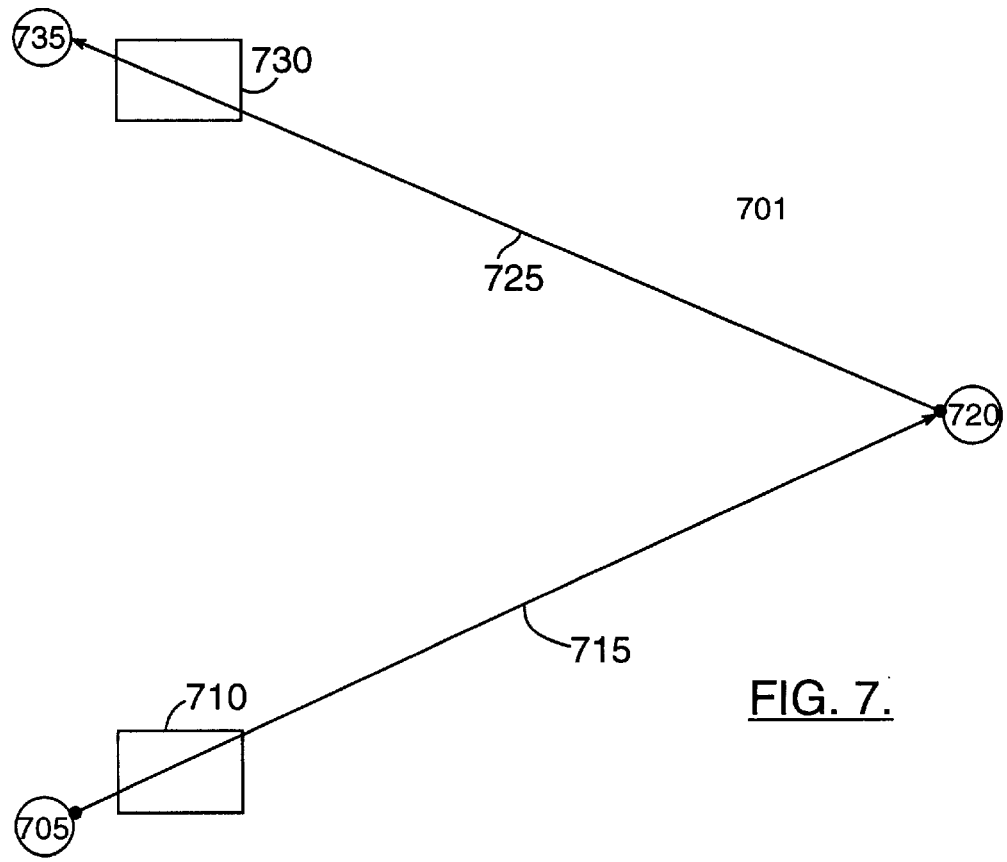
FIG. 7 is block diagram of a particular embodiment of the present invention.
Figure 8:
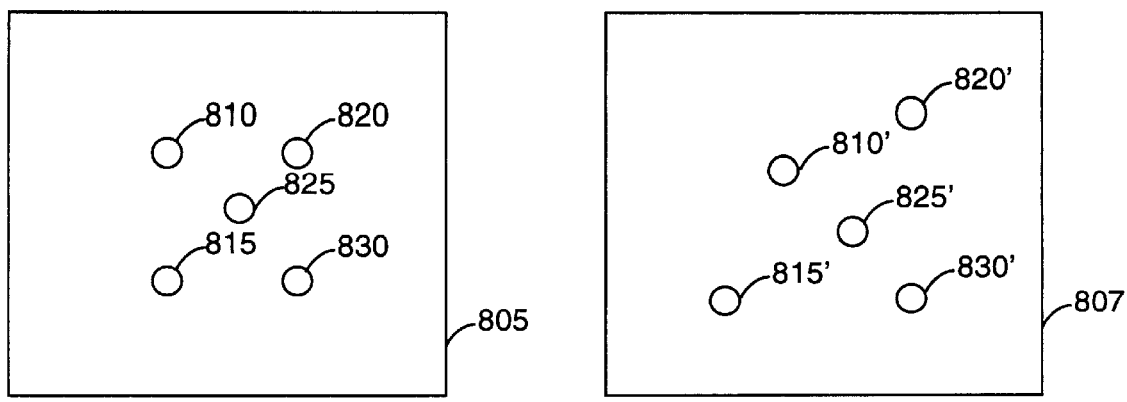
FIG. 8 is a block diagram of a correspondence between the camera image plane and the projector image plane.

FIGS. 7 and 8 illustrate a second embodiment of the present invention. FIG. 7 illustrates a system utilizing the present invention wherein the camera tracking is performed without a prediction. FIG. 8 illustrates an arrangement of elements within a structured light pattern and a exemplary correspondence to the same elements in a reflected pattern.

Projector 705 projects a pattern 715 comprised of individual elements 810, 815, 820, 825 and 830 through a projector image plane 710, creating a projector image plane pattern 805. The structured light pattern 715 impinges on an object 720 within the scene 701. The pattern 715 is reflected from the object 720, creating reflected pattern 725. The reflected pattern 725 intersects a camera image plane 730, creating a camera image plane pattern 807 and is detected by a camera 735.

The system illustrated in FIG. 7 determines the camera position by transforming the pattern 805 to the pattern 807. The transform is based on an analysis of the correspondence between several elements within the structured light pattern 805 and the position of the same elements within the reflected pattern 807 as it appears in the image plane 730. In this case, the prediction of the landmark locations in the image plane is not necessary, although a prediction may accelerate locating landmarks. The landmarks should be distinguishable from one another by some characteristic of the projection. For example, intensity and color may be used to distinguish one landmark from another. The landmarks may also be distinguishable by projecting and detecting each landmark sequentially.

Once the landmarks in the pattern (e.g., dots) are located on the camera image plane and a correspondence between each sighted landmark and each projected landmark is established, a transform determines the camera position and orientation, and internal projection parameters and the projector's 100 internal projection parameters.

Figure 9A:
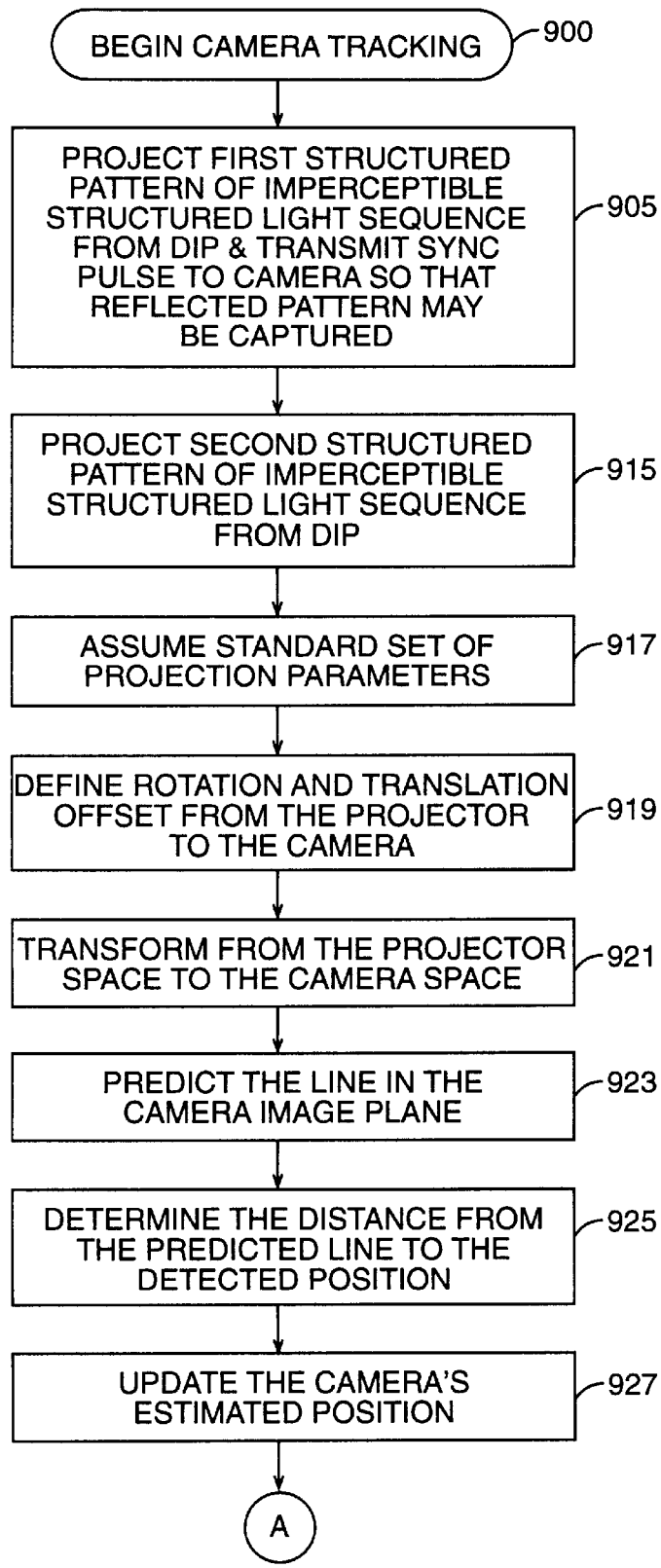
FIGS. 9A and B are flowcharts of a particular embodiment of the present invention.
Figure 9B:
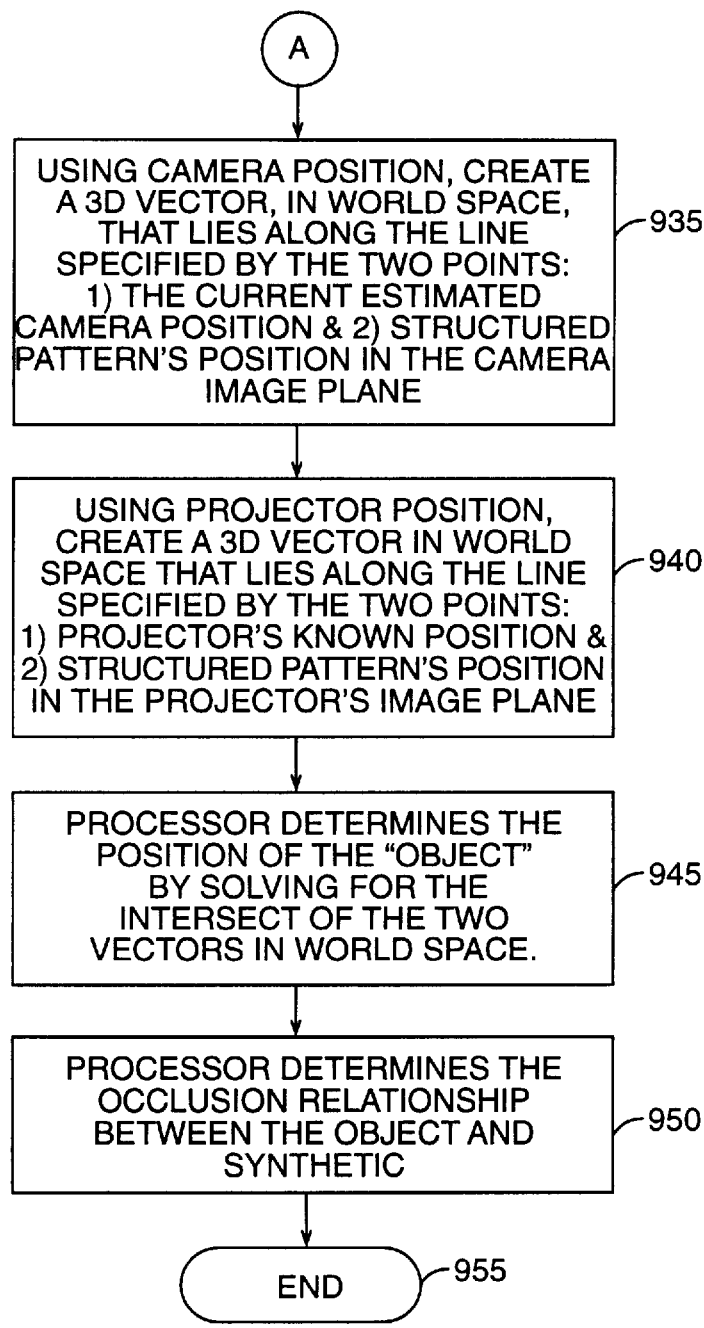
Figure 10:
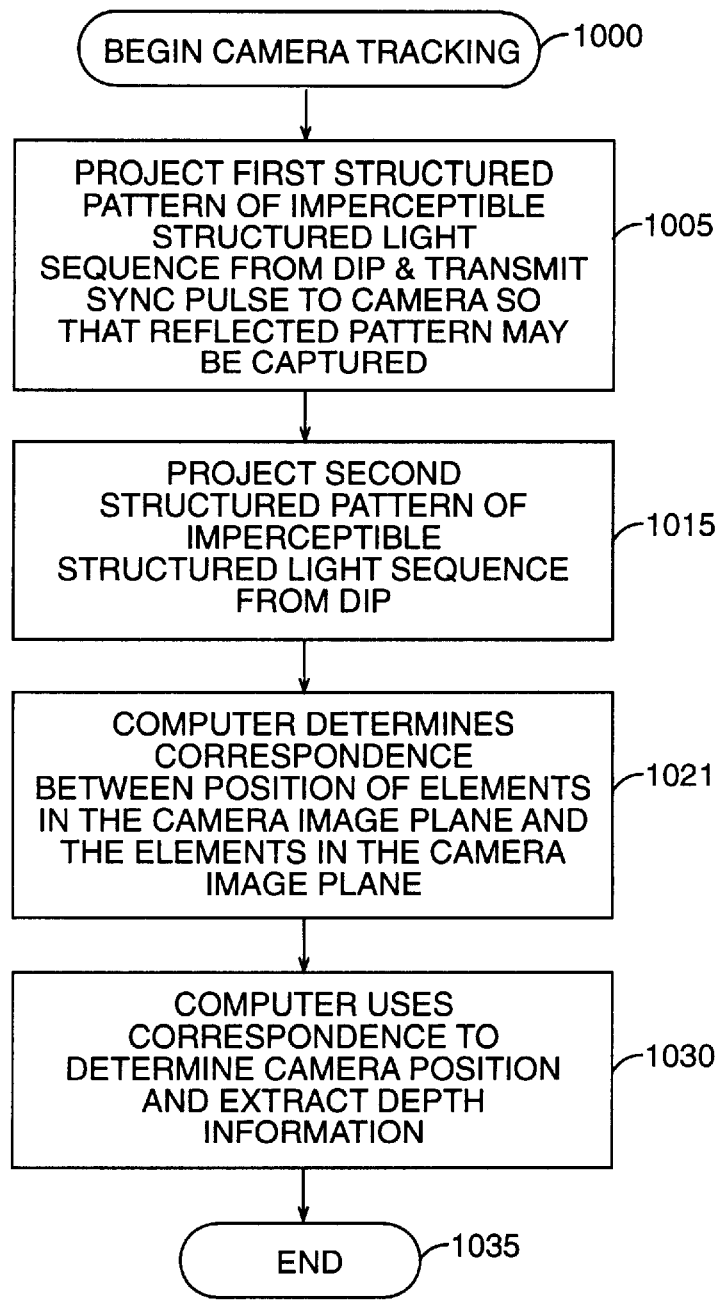
FIG. 10 is a flowchart of a particular embodiment of the present invention.

FIGS. 9A, 9B and 10 are flowcharts for tracking camera movement within a scene using imperceptible structured light. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks.

These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

FIGS. 9A and B conceptually illustrate the tracking of camera movement in a 3D scene using imperceptible structured light. To begin tracking (Block 900), the DLP projects the first structured light pattern of the imperceptible structured light onto the scene (Block 905). The camera exposure is synchronized to the projection of the first structured light pattern so that the camera captures the scene while illuminated by the first structured light pattern (Block 905). Approximately 5 ms later, the DLP projects the second structured light pattern of the imperceptible structured light sequence onto the scene (Block 915). The second structured light pattern has the effect of making the illumination of the scene seem continuous rather than a sequence of discrete images.

Using a standard set of camera and projector parameters (Block 917), the rotation and translation offset from the projector to the camera are defined (Block 919). The point in the projector's image plane is transformed to the camera space (Block 921), predicting the equation of the line in the camera's image plane (Block 923). The error (i.e., distance) between the predicted line equation and the detected position of the first structured light pattern in the camera's image plane is determined (Block 925). The determined error is used to update the estimated position for the camera (Block 927). New structured light patterns are then generated to continue tracking the camera movement Referring now to FIG. 9B, the 3D position of the object within the scene is then calculated to determine the proper occlusion relationship for the object. Using the current estimated camera position and the detected position of the structured light pattern in the camera's image plane, the computer determines a 3D vector in world space (Block 935). This vector represents a line in world space from the camera to the object in the scene. A second 3D vector is generated using the known projector position and the position of the structured light pattern in the projectors image plane (Block 940). The second vector represents a line from the projector to the object in the scene.

The intersection of the object in the scene is determined using both line equations (Block 945). The position of the object is then used to determine whether the object is occluded (Block 950). Although FIG. 9B is shown in conjunction with FIG. 9A to illustrate the tracking of camera movement in a 3D scene using imperceptible structured light, it should be understood that FIG. 9B also illustrates a system for determining scene geometry that may not require the operations described in FIG. 9A.

The operation of Blocks 917, 919, 921, 923, 925 and 927 of FIG. 9A may be carried out using an extended Kalman filter which estimates the current geometric properties of the system (i.e., the camera position, orientation, camera parameters, projector parameters and any value that may be derived from these such as camera velocity and acceleration).

The extended Kalman filter provides, under certain assumptions (e.g., normally distributed random noise in the measurements), a minimum mean squared error estimate of the state over time using the system's current state, a model of the state's behavior over time, a measurement process, and a function that predicts the measurement given the current state. In the present embodiment, the state of the system may include the camera position and orientation, the internal projection parameters of the camera and projector, and the camera's velocity and acceleration. Moreover, these parameters may be specified relative to some known geometric configuration of the environment (e.g., location of the projector) and need not be specified in absolute terms.

The prediction of the line on which the selected point should lie is accomplished with a series of matrices familiar to those skilled in the art (Blocks 917, 919, 921, and 923). In the present embodiment, these matrices, taken together, define how a pattern ($u_{p,i}$, $v_{p,i}$) on the projector's image plane maps to a line on the image plane of another imaging device.

The fundamental matrix, F, performs the mapping from pixels in the projector image plane to lines in the camera image plane. Once the Fundamental matrix is determined, then the error (or distance) between the detected position on the camera image plane ($u_{c,i}$, $v_{c,i}$) of the selected point and the predicted line can be determined. This distance formula may need to be normalized to provide distance in terms of some known units (e.g., the size of a pixel on the image plane, or millimeters).

Initially the internal projection parameters are set using a normalized coordinate system (i.e., some set of standard values) (Block 917). Effectively, this means that measurements (distances and angles) are made using the projector and camera (which in this embodiment are geometrically identical except for the direction that lights travels) as measuring devices.

The rotation and translation offsets from the projector to the camera are defined using a 3×3 matrix R and a 3-vector t as is common in the field (Block 919). The matrix T may be constructed from the vector t and be defined as:

$$T = \begin{bmatrix} 0 & -tz & ty \\ tz & 0 & -tx \\ -ty & tx & 0 \end{bmatrix}$$

Assuming that:

$$Tx=tx$$

A composite transformation, TR, is then used to create the essential matrix E. The Essential matrix maps the coordinate system of the projector to the camera (Block 921). The Essential matrix may be used to map a point on the projector image plane to a line in camera space (assuming that the vector t is not equal to the zero vector) (Block 923) and is defined by Em'. Therefore, the distance from a detected point m to this line can be expressed as:

$$m^T E m'$$

where m' is a point in the projector's image plane and m is a point in the camera's image plane and both m and m' are given in normalized pixel coordinates. Furthermore, the distance from m to the predicted line should be zero if the estimates for all the parameters are accurate.

Because the parameters were initially assumed (Block 917), the Fundamental matrix should consider the internal parameters of the camera and the internal parameters of the projector. Both sets affect how a pixel on the projector image plane will map to a line in the camera image plane. To provide a complete characterization of the relationship between the point in the projector image plane and the corresponding line in the camera image plane, and thus to the distance function defined above using the essential matrix mapping should include the projection matrices. Note that if m' is a point on the unnormalized projector image plane, then:

$$U_P^{-1} m'$$

is the same point on the normalized projector image plane. Similarly, if m is a point on the unnormalized camera image plane, then:

$$U_C^{-1} m$$

is the same point on the normalized camera image plane.

Mapping with the Essential matrix accounts for the motion in three dimensions but requires normalized pixel coordinates. It will be understood by those skilled in the art that a 3×3 matrix $U_c$ can map from the normalized pixel coordinates of a camera to the real pixel coordinates, by encapsulating the geometry of the projection operation performed by the camera:

$$(U_C^{-1}m)^T E (U_P^{-1}m') = m^T U_C^{-1T} E U_P^{-1} m'$$

which should be zero if all the parameters are accurately estimated.

The Fundamental matrix may then be defined with compensation for the internal projection parameters described above as:

$$F = U_C^{-1T} E U_P^{-1} = U_C^{-1T} TR U_P^{-1}$$

Further, the distance from the detected point to the predicted line in the camera image may be expressed as:

$$D = m^T F m'$$

This equation enables the system to analyze the error between the predicted location and the detected location. This error may be attributed to any or all of the parameters which determine the value of this function, namely the five parameters of motion in three dimensions defined up to a scale, the internal projection parameters of the projector (i.e., three, five or more parameters), and the internal projection parameters of the camera (i.e., three, five, or more).

In one embodiment, the error is attributed to a subset of parameters known to be the least accurately estimated and most critical in a given application. This would imply that the remaining parameters should be independently measured while the independent measures are accurate.

The adjustments to the values of the parameters depend, according to the method of Kalman filtering, on the partial derivatives of the distance function with respect to each of the parameters (Block 927). This process results from the Kalman filter and will be appreciated by one skilled in the art.

Although an extended Kalman filter is used in the above description, other equivalent techniques may be used. For example, a Wiener filter or the method of covariance intersection may also be used (with an appropriate re-organization of the state and behavioral model according to the assumptions of those methods).

FIG. 10 conceptually illustrates camera tracking with imperceptible structured light using a correspondence between the elements of two patterns.

To begin tracking, the DLP projects the first structured light pattern of the imperceptible structured light onto the scene (Block 1005). The camera exposure is synchronized to the projection of the first structured light pattern so that the camera captures the scene while illuminated by the first structured light pattern (Block 1005). Approximately 5ms later, the DLP projects the second structured light pattern of the imperceptible structured light sequence onto the scene (Block 1015). The second structured light pattern has the effect of making the illumination of the scene appear continuous rather than a sequence of discrete images.

The correspondence between the location of elements within the image plane of the projector and the location of the same elements within the image plane of the camera is then determined (Block 1021). This correspondence is then used to determine the camera position and to extract three dimensional depth information about the scene (Block 1030).

Either embodiment makes it possible to determine the location of objects within the scene 101 with respect to a synthetic object generated for augmenting the video image. In other words, once the camera position is determined it is possible to determine the position of the object being imaged within the scene. The unknown position of the imaged object may be determined using the solved camera position and the known projector position.

The system illustrated in FIG. 1 would also be scaleable in the number of projectors and cameras with minimal additional work required. This method would have several other advantages over current vision-based tracking methods. Increasing the number of projectors would also increase the size of the scene 101 that could be imaged. Moreover, the tracking volume would be limited only by the intensity and spread of the light, possibly allowing a room-sized tracking volume.

Either of the embodiments described above allow a system utilizing the invention to overcome temporary occlusion of landmarks from the cameras. Either embodiment also allows for computational effort to be concentrated in the area in which it will be most useful. The embodiments described above may, therefore, move landmarks into regions of the scene 101 that have not been used recently, improving stability and adding new information to the system's data of the scene.

Further, methods that compute the pose of a camera with respect to another camera also yield the real-world positions of the points used to establish correspondence between the camera and the source by the intersection of vectors in space. This means that depth values from the user's point of view can be quickly computed for every known correspondence. This is precisely the information that is needed for computing occlusion relationships between real and synthetic objects.

The above embodiments illustrate how the present invention may be utilized to determine the geometry of a scene using imperceptible structured light. The invention may also be utilized for purposes that do not require the use of imperceptible structured light. Similarly, the invention may be utilized for purposes that do not involve tracking camera movement within a scene.

For example, the invention may also be utilized to provide a means's for depth extraction of objects within a scene where the camera is stationary. Imperceptible structured light could be used to generate dynamic landmarks giving the same benefits described above. The object, however, would be to determine the position of objects within the scene with respect to a projector and a camera.

The invention may also be utilized to perform camera tracking without the use of imperceptible structured light. For example, in situations where disorientation of human observers is not a concern, the present invention may be utilized to track the movement of a camera using light that would be perceptible to an observer. The benefits associated with tracking the 3D movement of a camera would still be realized in such a system. For example, the present invention may be utilized to track the movement of a camera within a scene using laser light to create the landmarks used by the tracking system. The system would use the same process to track the movement of the camera.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for tracking the movement of a camera within the geometry of a scene using structured light comprising the steps of:

projecting a sequence of at least two structured light patterns within a projection interval onto a scene, wherein a first structured light pattern is structured so as to detect geometric data of the scene and is projected for a first projection time onto the scene and a second structured light pattern is structured so as to reduce an observer's perception of a visual artifact created by the projection of the first structured light pattern and is projected for a second projection time;

detecting a reflected light pattern from the scene in a two dimensional image plane of the camera, wherein the reflected light pattern is a reflection of the first structured light pattern;

sampling the scene coincident with the projection of the first structured light pattern; and determining a camera location based on a correspondence between the position of elements of the first structured light pattern and the position of the reflection of the same elements in a camera image plane.

2. The method of claim 1, wherein said projecting step comprises the step of projecting a sequence of at least two structured light patterns within a projection interval onto a scene, wherein the structure of the second pattern is selected so as to project an amount of light that complements the light projected onto the scene by the first pattern to maintain a substantially uniform density of light in the scene over the projection interval.

3. The method of claim 1, wherein said determining step comprises the steps of:

predicting a line equation representing a projection of a segment of the first structured light pattern within the two dimensional image plane of a camera;

determining an error associated with the predicted line equation and the position of the reflected light pattern in the two dimensional image plane; and applying the error associated so as to update a previous estimated location of the camera so as to produce a current estimated camera position.

4. A method for determining the geometry of a scene comprising the steps of:

projecting a sequence of at least two structured patterns within a projection interval onto a scene, wherein a first structured light pattern is structured so as detect geometric data of the scene and is projected for a first projection time onto the scene and a second structured light pattern is structured so as to reduce an observer's perception of a visual artifact created by the projection of the first structured light pattern and is projected for a second projection time; and examining the scene coincident with the projection of the first structured light pattern so as to determine three dimensional information about the scene from a reflected pattern of the first structured light pattern.

5. The method of claim 4, wherein said projecting step comprises the step of:

projecting a sequence of at least two structured light patterns within a projection interval onto a scene, wherein the structure of the second structured light pattern is selected so as to project an amount of light that complements the light projected onto the scene by the first structured light pattern so as to maintain a substantially uniform density of light in the scene over the projection.

6. The method of claim 5, wherein said projecting step comprises the steps of:
projecting a first structured light pattern onto a scene; and
projecting a second structured light pattern onto a scene, wherein the second structured light pattern represents a negative image of the first structured light pattern.

7. The method of claim 6, wherein the sequence of structured light patterns are generated by at least one pattern generator.

8. The method of claim 4, wherein said step of examining comprises the steps of:
generating a timing signal so as to be coincident with the projection of the first structured light pattern; and
applying the timing signal to a camera to make the camera exposure coincident with the projection of the first structured light pattern onto the scene.

9. The method of claim 4, further comprising the step of locating an object within the scene based on the determined three dimensional information about the scene and a camera location.

10. The method of claim 4, further comprising the step of locating the camera within the scene based on the determined three dimensional information about the scene and an object location.

11. The method claim 4, wherein said step of projecting comprises the step of projecting a sequence of at least two structured light patterns within a projection interval onto a scene, wherein the first projection time is independent of the second projection time.

12. The method of claim 4, wherein said projecting step comprises the step of projecting a sequence of at least two structured light patterns within a projection interval onto a scene, wherein the structure of the structured light pattern is defined using pixel intensity values.

13. The method of claim 4, wherein said projecting step comprises the step of projecting a sequence of at least two structured light patterns within a projection interval onto a scene, wherein the structure of the first structured light pattern is different from the structure of the second structured light pattern.

14. A method for tracking the movement of a camera within the geometry of a scene comprising the steps of:
projecting a pattern onto a scene from a known position;
detecting a reflected pattern from the scene in the two dimensional image plane of at least one camera; and
determining a current estimated camera location based on a correspondence between the position of elements of the projected pattern and the position of the corresponding elements of the reflected pattern in the camera image plane.

15. The method of claim 14, wherein said determining step comprises the steps of:
predicting a line equation representing a projection of a segment of the projected pattern within the two dimensional image plane of a camera;
determining an error associated with the predicted line equation and the position of the reflected pattern in the two dimensional image plane; and
applying the error associated with the predicted line equation so as to update a previous estimated location of the camera to provide a current estimated camera position.

16. The method of claim 15, wherein said predicting step comprises the step of performing a transform of the projected pattern from projector space to camera space.

17. The method of claim 15, wherein said determining step comprises the step determining the displacement between the predicted line equation and the position of the reflected pattern in the camera's two dimensional image plane.

18. The method of claim 15, wherein said applying step comprises the step of performing a transform from a previous estimated camera position to a current estimated camera position.

19. The method of claim 15, wherein said applying step comprises the step of applying the error associated with the predicted line equation so as to update a previous estimated location of the camera so as to provide a current estimated camera position, wherein the camera position is defined by three variables for a location within the scene and three variables for a camera pose.

20. The method of claim 14, further comprising the step of locating a position of an object within the scene based on a current estimated camera location and a known projector position and the projected pattern and the reflected pattern.

21. The method of claim 14, wherein said step of determining comprises the steps of
determining a correspondence between the elements within the projected pattern and elements within the detected pattern by analyzing the location of each element in the projected pattern and the detected pattern.

22. A system for tracking the movement of a camera within the geometry of a scene using structured light comprising:
means for projecting a sequence of at least two structured light patterns within a projection interval onto a scene, wherein a first structured light pattern is structured so as to detect geometric data of the scene and is projected for a first projection time onto the scene and a second structured light pattern is structured so as to reduce an observer's perception of a visual artifact created by the projection of the first structured light pattern and is projected for a second projection time;
means for detecting a reflected light pattern from the scene in a two dimensional image plane of the camera, wherein the reflected light pattern is a reflection of the first structured light pattern;
means for sampling the scene coincident with the projection of the first structured light pattern; and
means for determining a camera location based on a correspondence between the position of elements of the first structured light pattern and the position of the reflection of the same elements in a camera image plane.

23. The system of claim 22, wherein said means for projecting comprises the step of projecting a sequence of at least two structured light patterns within a projection interval onto a scene, wherein the structure of the second pattern is selected so as to project an amount of light that complements the light projected onto the scene by the first pattern to maintain a substantially uniform density of light in the scene over the projection interval.

24. The system of claim 21, wherein said means for determining comprises the steps of:
means for predicting a line equation representing a projection of a segment of the first structured light pattern within the two dimensional image plane of a camera;
means for determining an error associated with the predicted line equation and the position of the reflected light pattern in the two dimensional image plane; and means for applying the error associated so as to update a previous estimated location of the camera so as to produce a current estimated camera position.

25. A system for determining the geometry of a scene comprising:

means for projecting a sequence of at least two structured patterns within a projection interval onto a scene, wherein a first structured light pattern is structured so as detect geometric data of the scene and is projected for a first projection time onto the scene and a second structured light pattern is structured so as to reduce an observer's perception of a visual artifact created by the projection of the first structured light pattern and is projected for a second projection time; and means for examining the scene coincident with the projection of the first structured light pattern so as to determine three dimensional information about the scene from a reflected pattern of the first structured light pattern.

26. The system of claim 25, further comprising means for locating an object within the scene based on the determined three dimensional information about the scene and a camera location.

27. The system of claim 25, wherein said means for projecting comprises:

means for projecting a sequence of at least two structured light patterns within a projection interval onto a scene, wherein the structure of the second structured light pattern is selected so as to project an amount of light that complements the light projected onto the scene by the first structured light pattern so as to maintain a substantially uniform density of light in the scene over the projection.

28. A system for tracking the movement of a camera within the geometry of a scene comprising:

means for projecting a pattern onto a scene from a known position;

means for detecting a reflected pattern from the scene in the two dimensional image plane of at least one camera; and means for determining a current estimated camera location based on a correspondence between the position of elements of the projected pattern and the position of the corresponding elements of the reflected pattern in the camera image plane.

29. The system of claim 28, wherein said means for determining comprises:

means for predicting a line equation representing a projection of a segment of the projected pattern within the two dimensional image plane of a camera;

means for determining an error associated with the predicted line equation and the position of the reflected pattern in the two dimensional image plane; and means for applying the error associated with the predicted line equation so as to update a previous estimated location of the camera to provide a current estimated camera position.

* * * * *